(12) United States Patent
Nakahori

(10) Patent No.: US 7,623,362 B2
(45) Date of Patent: Nov. 24, 2009

(54) SWITCHING POWER SUPPLY UNIT

(75) Inventor: Wataru Nakahori, Tokyo (JP)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 12/289,383

(22) Filed: Oct. 27, 2008

(65) Prior Publication Data

US 2009/0109710 A1  Apr. 30, 2009

(30) Foreign Application Priority Data

Oct. 30, 2007  (JP)  ............................... 2007-282416
Sep. 25, 2008  (JP)  ............................... 2008-246501

(51) Int. Cl.
*H02H 7/125* (2006.01)

(52) U.S. Cl. ...................................................... 363/52

(58) Field of Classification Search .................. 363/17, 363/52, 53, 140
See application file for complete search history.

(56) References Cited

U.S. PATENT DOCUMENTS 4,449,174 A * 5/1984 Ziesse ........................ 323/282

FOREIGN PATENT DOCUMENTS

JP  A-2002-165453  6/2002

* cited by examiner

*Primary Examiner*—Shawn Riley
(74) *Attorney, Agent, or Firm*—Oliff & Berridge, PLC

(57) ABSTRACT

A switching power supply unit is provided, in which circuit efficiency can be effectively improved compared with a usual case. Secondary windings of a transformer are configured of two sheet metals. Rectifier diodes in a rectifier circuit are connected between the two sheet metals. Inductance of a line between the rectifier elements and the secondary windings is reduced compared with the usual case where rectifier elements are connected between secondary windings and a wiring area, and consequently surge voltage to the rectifier elements is effectively suppressed. A plurality of diode chips configuring the rectifier diodes are preferably disposed at equal spaces along a winding direction of each of the sheet metals.

7 Claims, 16 Drawing Sheets

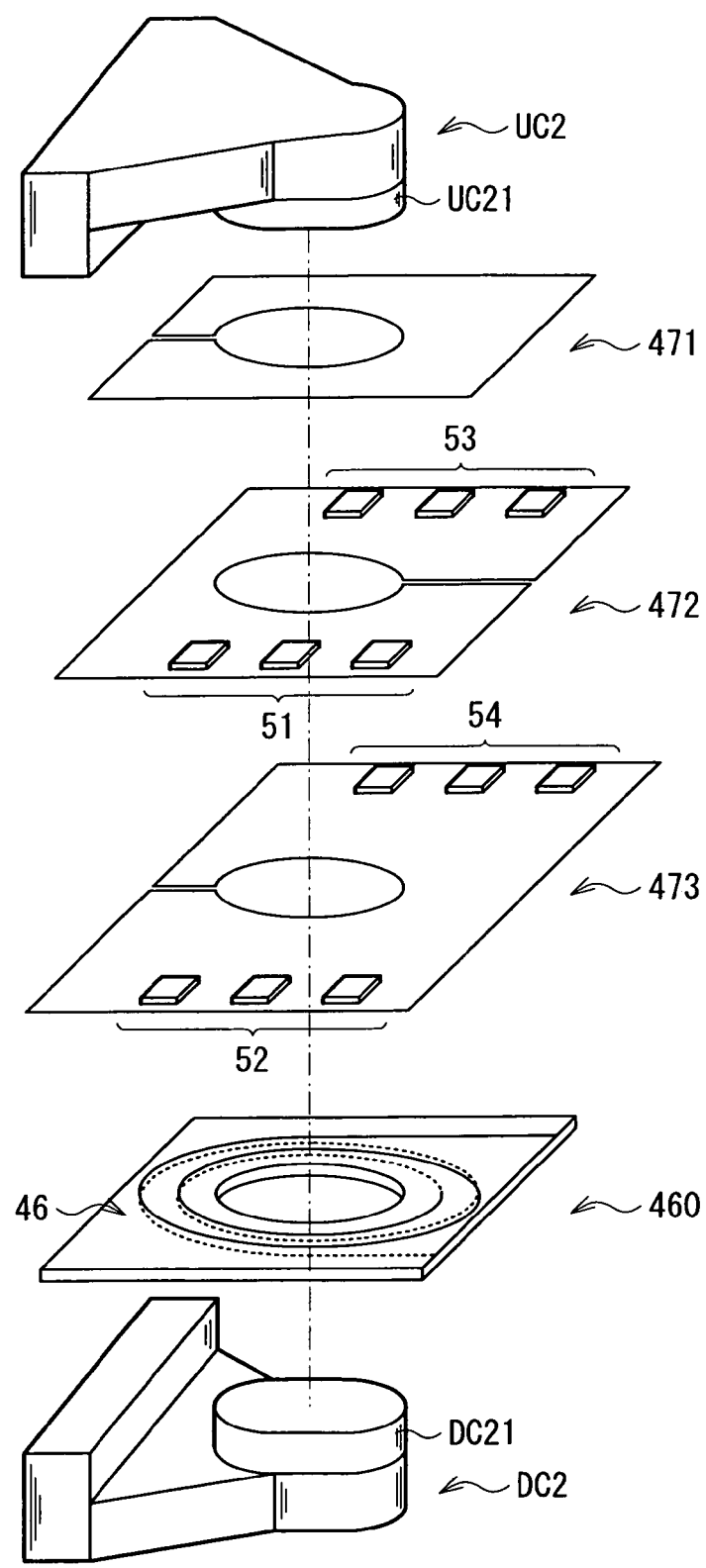
F I G. 16

SWITCHING POWER SUPPLY UNIT

CROSS REFERENCE TO RELATED APPLICATIONS

The present invention contains subject matter related to Japanese Patent Applications JP 2007-282416 filed on Oct. 30, 2007 and JP 2008-246501 filed on Sep. 25, 2008 in the Japanese Patent Office, the entire contents of which being incorporated herein by reference.

BACKGROUND OF THE INVENTION

1. Field of the Invention

The present invention relates to a switching power supply unit configured to produce switching output, which is obtained by switching a DC input voltage, at an output winding of a voltage conversion transformer.

2. Background Art

Various types of DC/DC converters have been proposed for a switching power supply unit, and provided for practical use in the past. Most of the DC/DC converters are in a type where a DC input voltage is subjected to switching by switching operation of a switching circuit connected to a primary winding of a power conversion transformer (transformer), and the switching output is produced at a secondary winging of the voltage conversion transformer. A voltage induced in the secondary winging with switching operation of the switching circuit is rectified by a rectifier circuit, then converted into a DC voltage by a smoothing circuit, and then outputted.

In this type of switching power supply unit, excessive surge voltage has been sometimes applied to rectifier elements in the rectifier circuit due to inductance of a line between the rectifier elements and windings of the transformer. When such excessive surge voltage is induced, heat generation by the rectifier elements is increased, in addition, power loss is increased, leading to reduction in circuit efficiency.

Thus, for example, Japanese Unexamined Patent Publication No. 2002-165453 proposes a switching power supply unit in which rectifier diodes are fixed integrally with a rectangular conductor line configuring a secondary coil so as to suppress heat generation or power loss in the rectifier diodes.

SUMMARY OF THE INVENTION

However, in the Japanese Unexamined Patent Publication No. 2002-165453, since the rectifier diodes are connected between the secondary coil and a wiring area (busbar), inductance of the line between the rectifier diodes and the secondary winding of the transformer is not adequately reduced, consequently the surge voltage has been hard to be effectively suppressed. Accordingly, circuit efficiency has been still hard to be effectively improved.

In view of forgoing, it is desirable to provide a switching power supply unit in which circuit efficiency can be effectively improved compared with a usual case.

A first switching power supply unit of an embodiment of the invention, which has an input terminal pair and an output terminal pair, and performs voltage conversion of a DC input voltage inputted from the input terminal pair, thereby outputs a DC output voltage from the output terminal pair, includes a transformer having a first winding disposed on an input terminal pair side and a second winding disposed on an output terminal pair side, an inverter circuit being disposed on a first winding side, and performing switching operation onto the DC input voltage, and a rectifying-smoothing circuit disposed on a second winding side, and rectifying and smoothing an AC voltage induced on the second winding in response to the switching operation of the inverter circuit, thereby generating the DC output voltage. The second winding is configured of a plurality of conductive plates, and the rectifying-smoothing circuit has one or more rectifier elements connected between two conductive plates of the plurality of conductive plates.

In the first switching power supply unit of an embodiment of the invention, the DC input voltage inputted from the input terminal pair is subjected to switching in the inverter circuit so as to generate an input AC voltage, and the input AC voltage is transformed by the transformer, and an output AC voltage is outputted from the second winding side of the transformer. The output AC voltage is rectified and smoothed by the rectifying and smoothing circuit, thereby the DC output voltage is outputted from the output terminal pair. The second winding is configured of the plurality of conductive plates, and the rectifier elements in the rectifying and smoothing circuit are connected between two conductive plates of the plurality of conductive plates. Therefore, inductance of a line between the rectifier elements and a secondary winding is reduced compared with a usual case where rectifier elements are connected between a secondary winding and a wiring area, and consequently surge voltage to the rectifier elements is effectively suppressed.

The first switching power supply unit of an embodiment of the invention may be designed such that a plurality of rectifier elements are connected between the two conductive plates. In this case, the plurality of rectifier elements are preferably disposed at equal spaces along a winding direction of each of the two conductive plates. In the case of such a configuration, the inductance of the line between the rectifier elements and the secondary winding may store less energy, which effectively suppresses surge voltage to the rectifier elements. Moreover, each rectifier element can be kept at a relatively low temperature.

In the first switching power supply unit of an embodiment of the invention, one of the two conductive plates, the one provided on a heat sink path for the rectifier elements, preferably has an area larger than that of the other conductive plate. In the case of such a configuration, since the amount of heat sink from the rectifier elements to the heat sink path side is increased, each rectifier element can be kept at a relatively low temperature.

In the first switching power supply unit of an embodiment of the invention, the two conductive plates face each other, and the first winding is preferably disposed between the two conductive plates. In the case of such a configuration, compared with a case where the first winding is disposed in a region other than a region between the layers of the two conductive plates, power loss is decreased in the first winding and in the two conductive plates due to a proximity effect, consequently circuit efficiency is improved.

The first switching power supply unit of an embodiment of the invention can be configured such that the transformer has first and second magnetic cores, each of the first and second magnetic cores having a pair of leg portions and a base portion which combines one end of one of the leg portions and one end of the other leg portion, and the first winding and the plurality of conductive plates are wound in planes perpendicular to an extending direction the leg portions of the first and second magnetic cores.

In the first switching power supply unit of an embodiment of the invention, the second winding can be made to be a secondary winding of the transformer.

In the first switching power supply unit of an embodiment of the invention, the rectifier elements can be made to be diodes or field effect transistors (FETs).

A second switching power supply unit of an embodiment of the invention performs voltage conversion of a DC input voltage inputted from one input/output terminal pair of first and second input/output terminal pairs, thereby outputting a DC output voltage from the other input/output terminal pair. The second switching power supply unit includes a transformer having a first winding disposed on a side of the first input/output terminal pair and a second winding disposed on a side of the second input/output terminal pair, and a first circuit disposed on a side of the first winding. The first circuit has a plurality of first switching elements and first rectifier elements. The first rectifier elements are connected in parallel to the plurality of first switching elements respectively. The second switching power supply unit also includes a second circuit disposed on side of the second winding. The second winding has a plurality of second switching elements and second rectifier elements. The second rectifier elements are connected in parallel to the plurality of second switching elements respectively. The second winding is configured of a plurality of conductive plates, and the second rectifier elements in the second circuit are connected between two conductive plates of the plurality of conductive plates.

In the second switching power supply unit of an embodiment of the invention, in forward operation, a DC input voltage is inputted from the first input/output terminal pair, and an input AC voltage is generated by the first switching elements in the first circuit operating as an inverter circuit. When the input AC voltage is inputted into the first winding side of the transformer, the input AC voltage is transformed, and an output AC voltage is outputted from the second winding side. The output AC voltage is rectified by the second rectifier elements in the second circuit operating as a rectifier circuit, and a DC output voltage is outputted from the second input/output terminal pair. On the other hand, in reverse operation, a DC input voltage is inputted from the second input/output terminal pair, and an input AC voltage is generated by the second switching elements in the second circuit operating as an inverter circuit. When the input AC voltage is inputted into the second winding side of the transformer, the input AC voltage is transformed, and an output AC voltage is outputted from the first winding side. The output AC voltage is rectified by the first rectifier elements in the first circuit operating as a rectifier circuit, and a DC output voltage is outputted from the first input/output terminal pair. Since the second winding is configured of the plurality of conductive plates, and the second rectifier elements in the second circuit are connected between two conductive plates of the plurality of conductive plates, inductance of a line between the second rectifier elements and the second winding is reduced compared with a usual case where rectifier elements are connected between a secondary winding and a wiring area, and consequently surge voltage to the second rectifier elements is effectively suppressed.

ADVANTAGE OF THE INVENTION

According to the first switching power supply unit of an embodiment of the invention, the second winding of the transformer is configured of a plurality of conductive plates, and the rectifier elements in the rectifying and smoothing circuit are connected between two conductive plates of the plurality of conductive plates. Therefore, inductance of a line between the rectifier elements and the secondary winding is reduced compared with the usual case, and consequently surge voltage to the rectifier elements is effectively suppressed. Accordingly, circuit efficiency can be effectively improved compared with the usual case.

According to the second switching power supply unit of an embodiment of the invention, the second winding of the transformer is configured of a plurality of conductive plates, and the second rectifier elements in the second circuit are connected between two conductive plates of the plurality of conductive plates. Therefore, inductance of a line between the second rectifier elements and the second winding is reduced compared with the usual case, and consequently surge voltage to the second rectifier elements is effectively suppressed. Accordingly, circuit efficiency can be effectively improved compared with the usual case.

Other and further objects, features and advantages of the invention will appear more fully from the following description.

BRIEF DESCRIPTION OF THE DRAWINGS

FIG. 16 shows an exploded perspective view showing an outside configuration of the major part of each of the transformer and the rectifier circuit shown in FIG. 14;

DETAILED DESCRIPTION OF THE PREFERRED EMBODIMENTS

Hereinafter, the best mode for carrying out the invention (hereinafter, simply called embodiment) will be described in detail with reference to drawings.

First Embodiment

Figure 1:
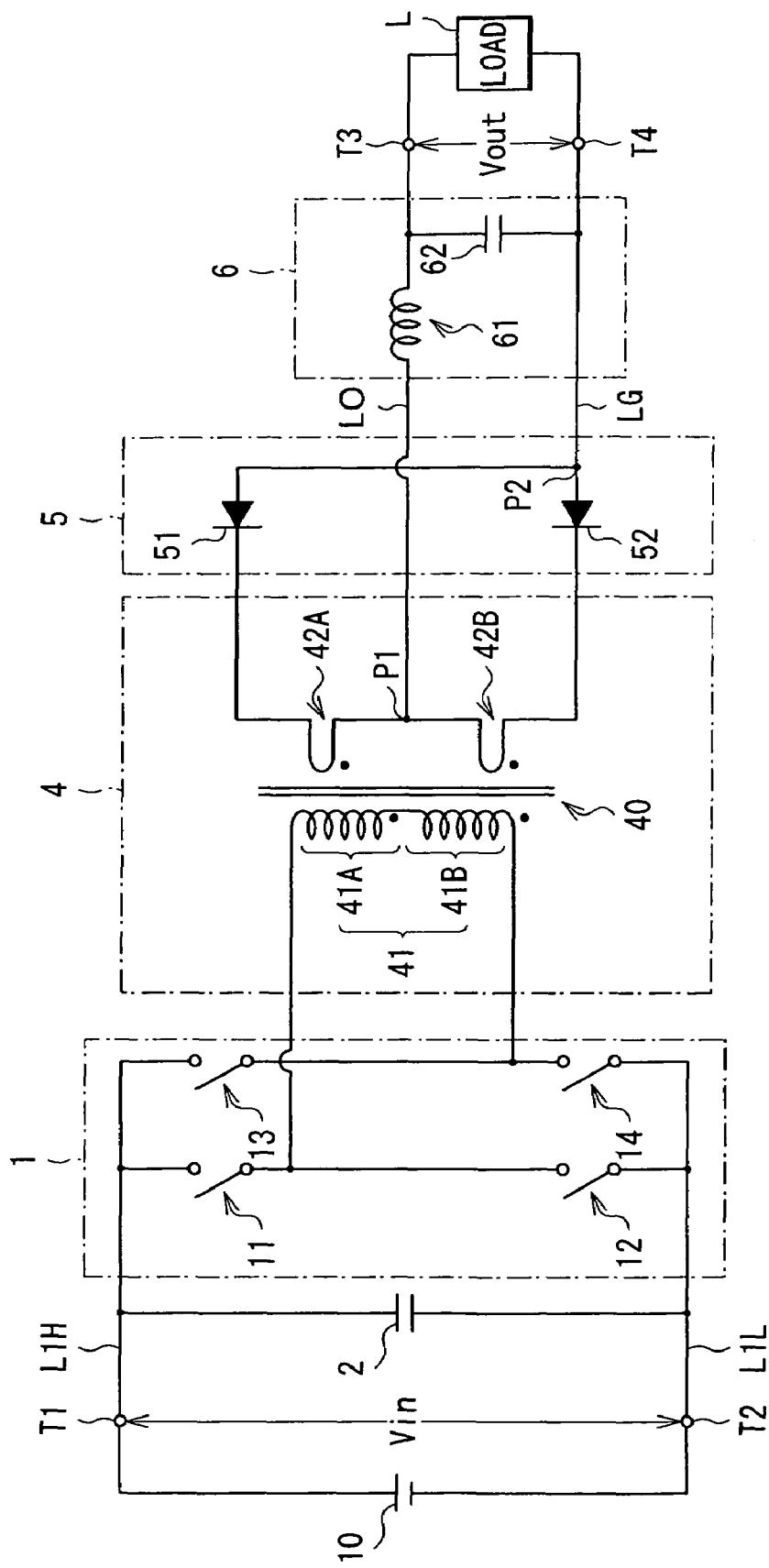
FIG. 1 shows a circuit diagram showing a configuration of a switching power supply unit according to a first embodiment of the invention.

FIG. 1 shows a circuit configuration of a switching power supply unit according to a first embodiment of the invention. The switching power supply unit operates as a DC/DC converter that converts a high DC input voltage Vin supplied from a high-voltage battery 10 into a relatively low DC output voltage Vout, and supplies the output voltage to a not-shown low-voltage battery to drive a load L.

The switching power supply unit has an input smoothing capacitor 2 provided between a primary high-voltage line L1H and a primary low-voltage line L1L, an inverter circuit 1 provided between the primary high-voltage line L1H and the primary low-voltage line L1L, and a transformer 4 having primary windings 41 (41A and 41B) and secondary windings 42 (42A and 42B). The DC input voltage Vin outputted from the high-voltage battery 10 is applied between an input terminal T1 of the primary high-voltage line L1H and an input terminal T2 of the primary low-voltage line L1L. The switching power supply unit 1 further has a rectifier circuit 5 provided at a secondary side of the transformer 4, and a smoothing circuit 6 connected to the rectifier circuit 5.

The input smoothing capacitor 2 smoothes the DC input voltage Vin inputted from the input terminals T1 and T2.

The inverter circuit 1 is in a circuit configuration of a full bridge type including four switching elements 11 to 14. Specifically, one ends of the switching elements 11 and 12 are connected to each other, and one ends of the switching elements 13 and 14 are connected to each other. Those one ends are connected to each other via the primary windings 41A and 41B of the transformer 4. In addition, the other ends of the switching elements 11 and 13 are connected to each other, and the other ends of the switching elements 12 and 14 are connected to each other. Those other ends are connected to the input terminals T1 and T2 respectively. According to such a configuration, the inverter circuit 1 converts the DC input voltage Vin applied between the input terminals T1 and T2 into the input AC voltage according to a drive signal supplied from a not-shown drive circuit.

For the switching elements 11 to 14, for example, a switch element such as Metal Oxide Semiconductor-Field Effect Transistor (MOS-FET) or IGBT (Insulated Gate Bipolar Transistor) is used.

The transformer 4 has a magnetic core 40 configured of an upper U-shaped core UC1 and a lower U-shaped core DC1 described later, a pair of primary windings 41A and 41B, and a pair of secondary windings 42A and 42B. Among them, the pair of primary windings 41A and 41B are connected in series to each other. The pair of secondary windings 42A and 42B are connected to each other at one ends of them at a center tap P1, and wiring from the center tap P1 is guided to an output line LO. The transformer 4 transforms an input AC voltage generated by the inverter circuit 1, and outputs output AC voltages, having phases different by 180 degrees from each other, from respective ends of the pair of secondary windings 42A and 42B (each end at a side opposite to the center tap P1). In this case, a transformation level is determined by a winding ratio between the primary windings 41A and 41B and the secondary windings 42A and 42B.

The rectifier circuit 5 is a rectifier circuit of a single-phase full-wave rectification type including a pair of rectifier diodes 51 and 52. A cathode of the rectifier diode 51 is connected to the other end of the secondary winding 42A of the transformer 4, and a cathode of the rectifier diode 52 is connected to the other end of the secondary winding 42B of the transformer 4. Anodes of the rectifier diodes 51 and 52 are connected to each other at a connection point P2, and guided to a ground line LG. That is, the rectifier circuit 5 has a configuration of anode-common connection of a center tap type, wherein each half-wave period of the output AC voltage from the transformer 4 is individually rectified by the rectifier diodes 51 and 52 so as to obtain a DC voltage. A detailed configuration of each of the rectifier circuit 5 and the transformer 4 is described later.

The smoothing circuit 6 includes a choke coil 61 and an output smoothing capacitor 62. The choke coil 61 is disposed on the output line LO in an insertional manner, and connected to the center tap P1 at one end, and connected to an output terminal T3 of the output line LO at the other end. The output smoothing capacitor 62 is connected between the output line LO and the ground line LG. An output terminal T4 is provided at an end of the ground line LG. According to such a configuration, the smoothing circuit 6 smoothes the DC voltage rectified by the rectifier circuit 5 to generate a DC output voltage Vout, and supplies the voltage Vout to the low-voltage battery (not shown) from the output terminals T3 and T4.

Figure 2:
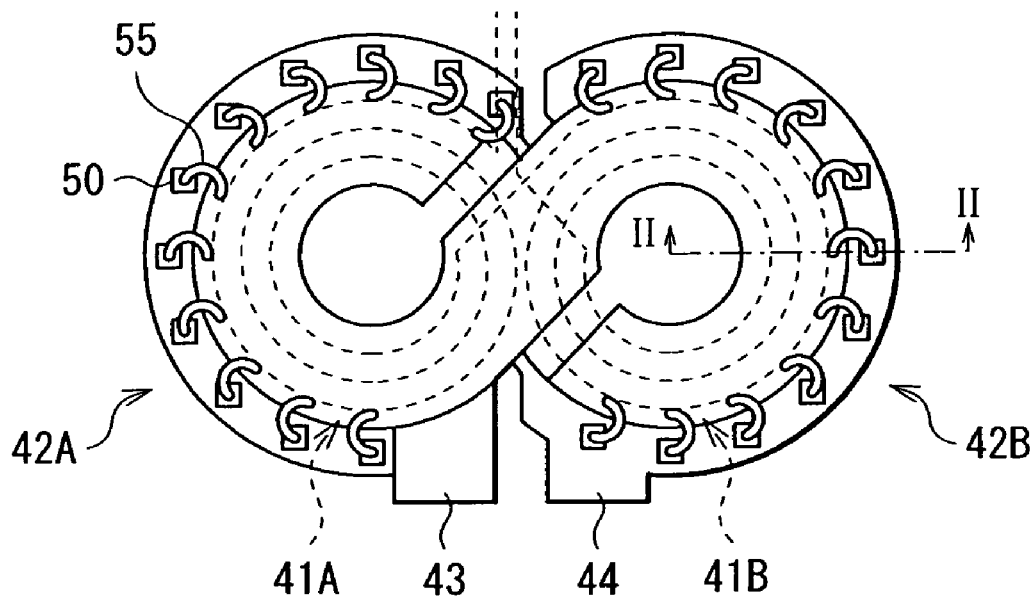
FIG. 2 shows a plan view showing an outside configuration of a major part of each of a transformer and a rectifier circuit shown in FIG. 1.
Figure 3:
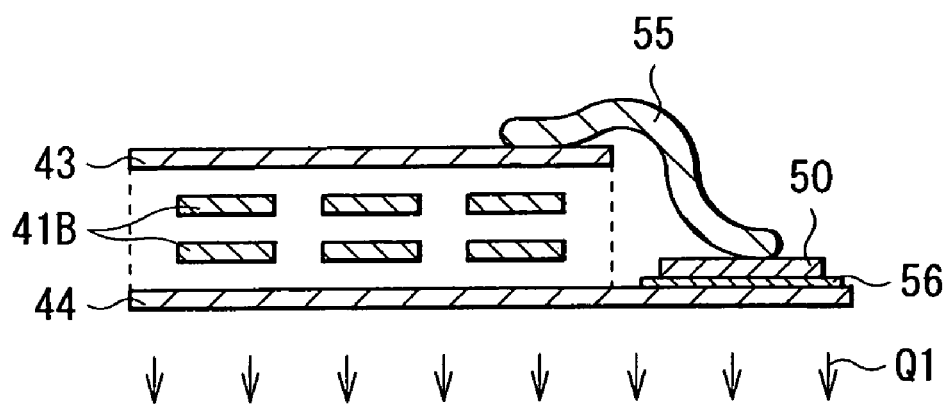
FIG. 3 shows a section view showing an outside configuration of the major part of each of the transformer and the rectifier circuit shown in FIG. 2.
Figure 4:
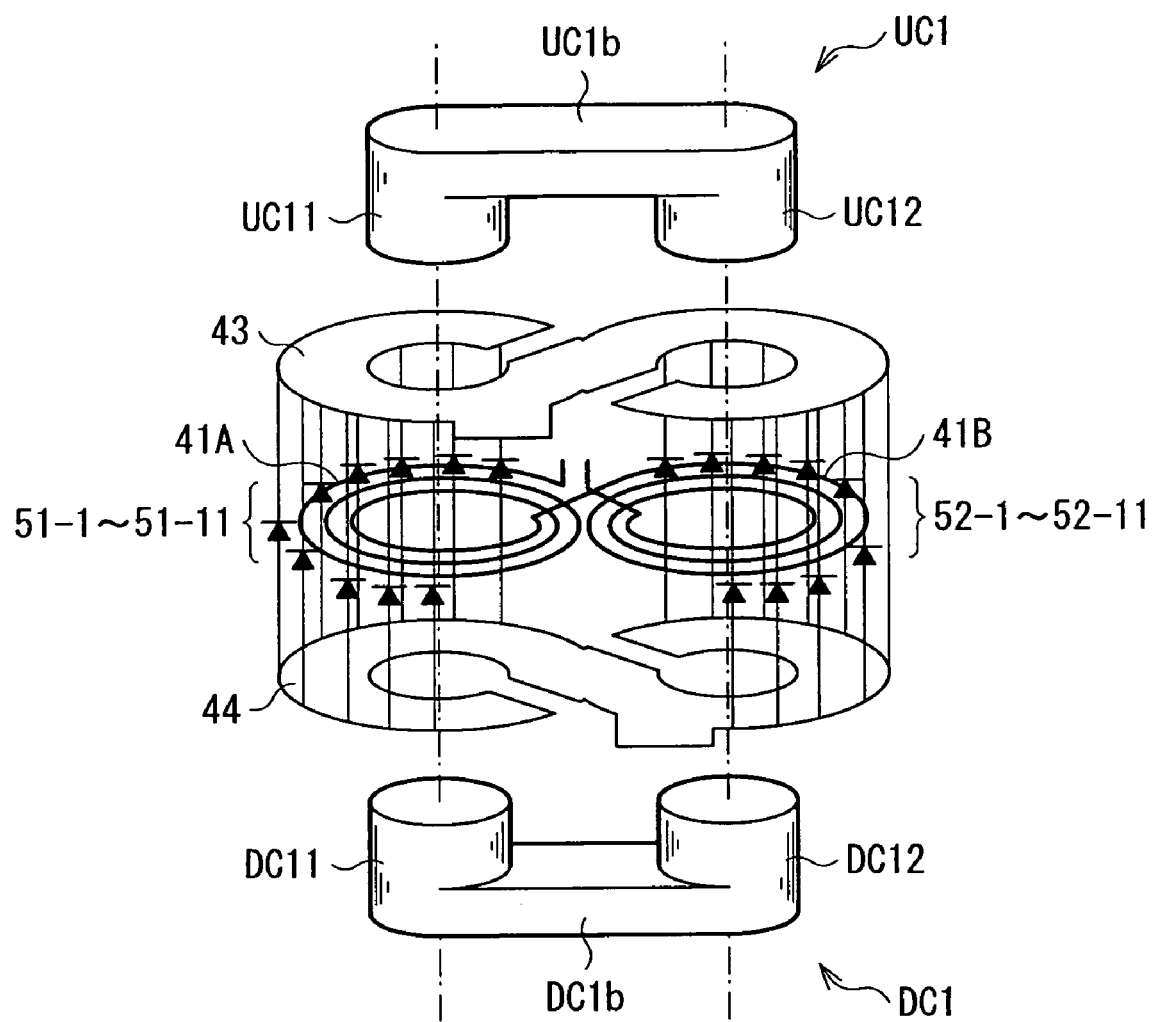
FIG. 4 shows an exploded perspective view showing an outside configuration of the major part of each of the transformer and the rectifier circuit shown in FIG. 2.

Next, the detailed configuration of each of the transformer 4 and the rectifier circuit 5, those being main characteristic portions of an embodiment of the invention, is described with reference to FIGS. 2 to 5. FIG. 2 shows a plan view of an outside configuration of a major part of each of the transformer 4 and the rectifier circuit 5. FIG. 3 shows a sectional configuration seen in an arrow direction along a line II-II in FIG. 2. FIG. 4 shows an exploded perspective view of an outside configuration of the major part of each of the transformer 4 and the rectifier circuit 5 shown in FIG. 2.

As shown in FIGS. 2 and 4, the transformer 4 has a structure where around a core material (magnetic core 40) being a U-U core including the upper U-shaped core UC1 and the lower U-shaped core DC1 opposed to each other, the primary windings 41A and 41B and two sheet metals 43 and 44 configuring the secondary windings 42A and 42B are wound in planes (horizontal planes) perpendicular to an extending direction (vertical direction) of magnetic cores UC11, DC11, UC12 and DC12 described below, respectively. The upper U-shaped core UC1 is configured of a base core UC1b, and a first magnetic core UC11 and a second magnetic core UC12 configuring two legs extending from the base core UC1b. The lower U-shaped core DC1 is configured of a base core DC1b, and a first magnetic core DC11 and a second magnetic core DC12 configuring two legs extending from the base core DC1*b*. The upper U-shaped core UC1 and the lower U-shaped core DC1 include a magnetic material such as ferrite respectively, and the primary windings 41A and 41B and the sheet metals 43 and 44 include a conductive material such as copper or aluminum respectively.

Between the two sheet metals 43 and 44, a plurality of diode chips 50 (rectifier diodes 51-1 to 51-11) configuring a rectifier diode 51, and a plurality of diode chips 50 (rectifier diodes 52-1 to 52-11) configuring a rectifier diode 52 are connected respectively by a bonding wire 55 and solder 56 described later. The rectifier diodes 51-1 to 51-11 and the rectifier diodes 52-1 to 52-11 are connected to the sheet metal 44 at their anodes, and connected to the sheet metal 43 at their cathodes, and disposed at equal spaces along a winding direction of each of the sheet metals 43 and 44, respectively.

As shown in FIGS. 3 and 4, the primary windings 41A and 41B are disposed between layers of the two sheet metals 43 and 44 respectively. Between the two sheet metals 43 and 44, the sheet metal 44 at a heat sink path side (sheet metal 44 side) of the diode chips 50 (rectifier diodes 51 and 52) has a large area compared with the sheet metal 43 at the other side (sheet metal 43 side). At the sheet metal 44 side, a substrate (not shown) is disposed, on which the inverter circuit 1, the smoothing circuit 6, metal plates (not shown) and the like are provided, and thereby a main heat sink path is configured. As shown in FIG. 3, this increases heat flow Q1 (amount of heat sink) from the diode chips 50 to a heat sinkpath side, therefore the amount of allowable loss in each diode chip 50 can be increased. Accordingly, each rectifier element can be kept at a relatively low temperature. Thus, a crack can be prevented from occurring in a solder joint, the crack being caused by repeated thermal expansion and contraction, and consequently reduction in electric conduction or heat conduction can be prevented.

Figure 5:
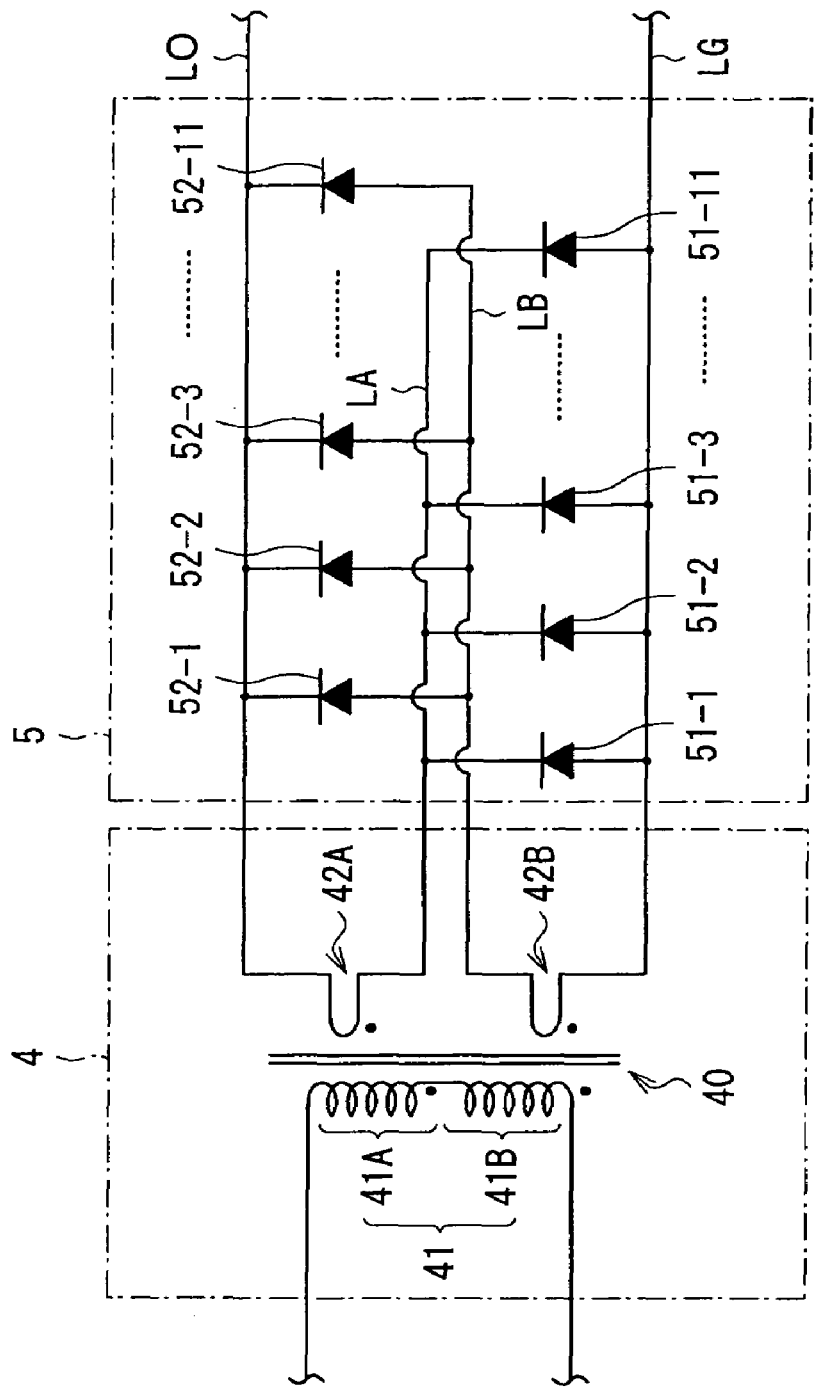
FIG. 5 shows a circuit diagram showing an equivalent circuit of each of the transformer and the rectifier circuit shown in FIG. 2.

Equivalent circuits of the transformer 4 and the rectifier circuit 5 shown in FIGS. 2 to 4 are as shown in FIG. 5 respectively. That is, the rectifier diodes 51-1 to 51-11 are connected in parallel between the ground line LG and the connection line LA at one end side of the secondary winding 42A (each anode is connected to a ground line LG side, and each cathode is connected to a connection line LA side). Moreover, the rectifier diodes 52-1 to 52-11 are connected in parallel between the connection line LB at one end side of the secondary winding 42B and the output line LO (each anode is connected to a connection line LB side, and each cathode is connected to an output line LO side).

The input terminals T1 and T2 correspond to a specific example of "input terminal pair" of an embodiment of the invention, and the output terminals T3 and T4 correspond to a specific example of "output terminal pair" of an embodiment of the invention. The primary windings 41 (41A and 41B) correspond to a specific example of "first winding" of an embodiment of the invention, and the secondary windings 42A and 42B correspond to a specific example of "second winding" of an embodiment of the invention. The rectifier circuit 5 and the smoothing circuit 6 correspond to a specific example of "rectifying and smoothing circuit" of an embodiment of the invention. The sheet metals 43 and 44 correspond to a specific example of each of "a plurality of conductive plates" and "two conductive plates" of an embodiment of the invention. The rectifier diodes 51 and 52 and the diode chips 50 correspond to a specific example of "rectifier elements" and a specific example of "diodes" of an embodiment of the invention respectively. The sheet metal 44 corresponds to a specific example of "conductive plate at the heat sink path side" of an embodiment of the invention, and the sheet metal 43 corresponds to a specific example of "conductive plate at the other side" of an embodiment of the invention. The first magnetic cores UC11 and DC11 correspond to a specific example of "first magnetic core" of an embodiment of the invention, and the second magnetic cores UC12 and DC12 correspond to a specific example of "second magnetic core" of an embodiment of the invention.

Next, a function of the switching power supply unit of an embodiment of the invention is described with reference to FIGS. 6 to 8.

First, basic operation of the switching power supply unit of an embodiment of the invention is described with reference to FIGS. 6 and 7.

In the switching power supply unit, the inverter circuit 1 performs switching to the DC input voltage Vin supplied from the input terminals T1 and T2 so as to generate an input AC voltage, and the input AC voltage is supplied to the primary windings 41A and 41B of the transformer 4. The transformer 4 transforms the input AC voltage, and the transformed output AC voltage is outputted from the secondary windings 42A and 42B.

In the rectifier circuit 5, the output AC voltage outputted from the transformer 4 is rectified by the rectifier diodes 51 and 52. Thus, rectified output is generated between the center tap P1 and the connection point P2 between the rectifier diodes 51 and 52.

In the smoothing circuit 6, the rectified output generated from the rectifier circuit 5 is smoothed by the choke coil 61 and the output smoothing capacitor 62, and then outputted as the DC output voltage Vout from the output terminals T3 and T4. The DC output voltage Vout is supplied to the not-shown low-voltage battery for charging the battery, and for driving the load L.

In the switching power supply unit of the embodiment, a period when the switching elements 11 and 14 are oh, and a period when the switching elements 12 an 13 are on are alternately repeated. Thus, operation of the switching power supply unit is described further in detail as follows.

Figure 6:
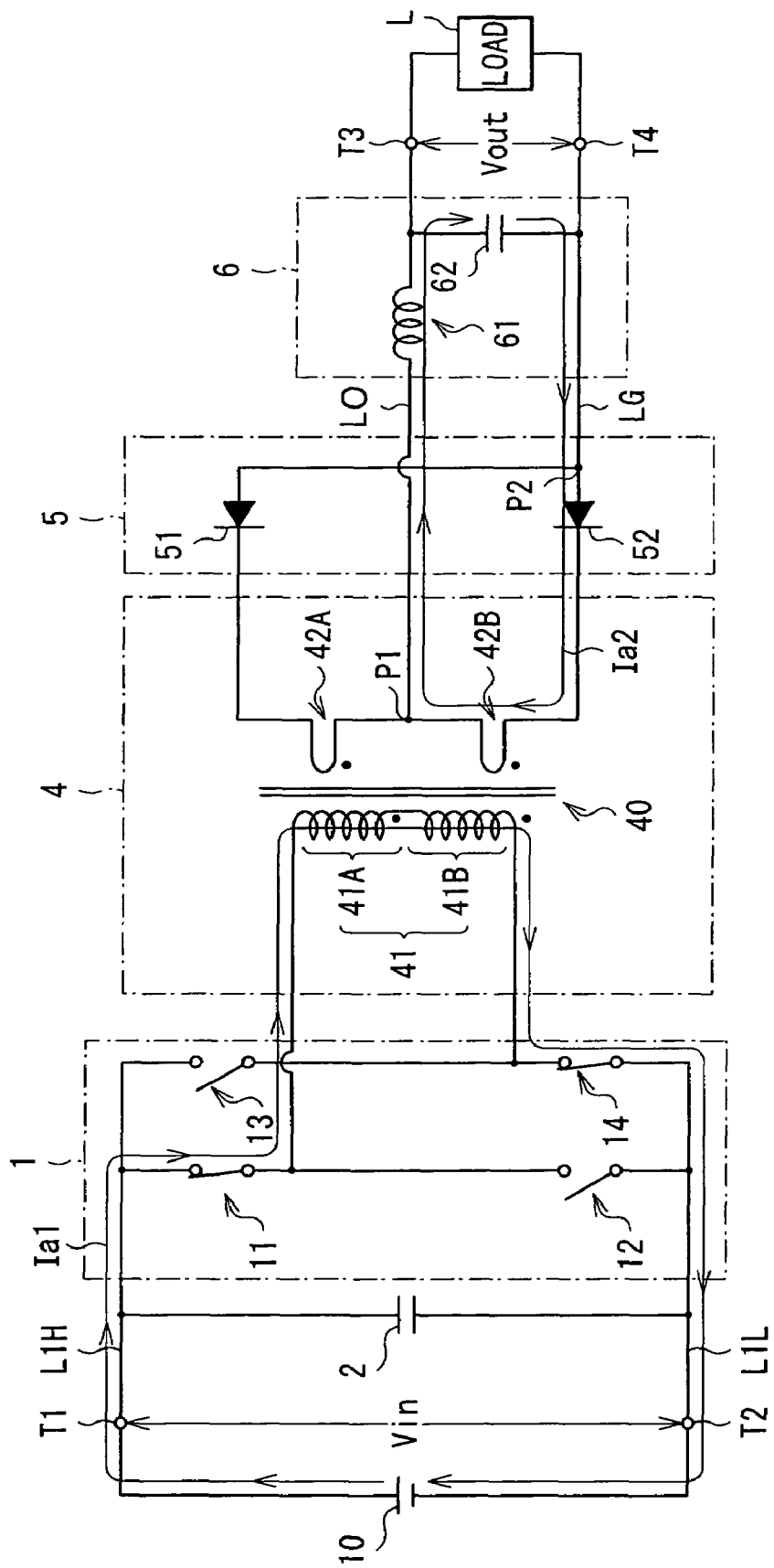
FIG. 6 shows a circuit diagram for illustrating basic operation of the switching power supply unit shown in FIG. 1.

First, as shown in FIG. 6, when the switching elements 11 and 14 of the inverter circuit 1 are turned on respectively, a primary loop current Ia1 flows in a direction from the switching element 11 to the switching element 14. Thus, voltages induced in the secondary windings 42A and 42B of the transformer 4 respectively are in a reverse direction with respect to the rectifier diode 51, but in a forward direction with respect to the rectifier diode 52. Thus, a secondary loop current Ia2 flows through the rectifier diode 52, secondary winding 42B, choke coil 61, and output smoothing capacitor 62 in order. The secondary loop current Ia2 flows in this way, thereby the DC output voltage Vout is supplied to the not-shown low-voltage battery, and the load L is driven.

Figure 7:
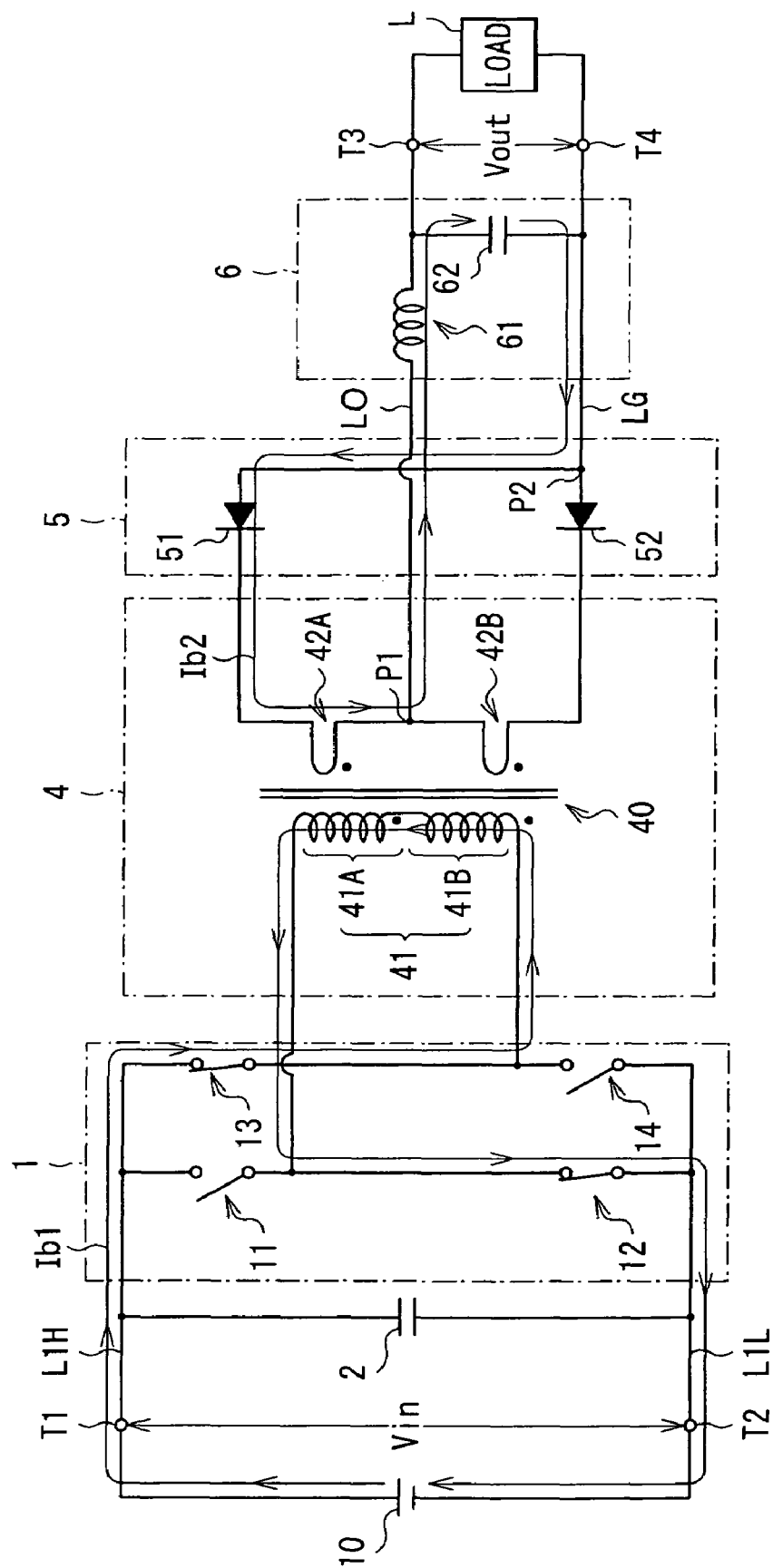
FIG. 7 shows a circuit diagram for illustrating the basic operation of the switching power supply unit shown in FIG. 1.
Figure 8:
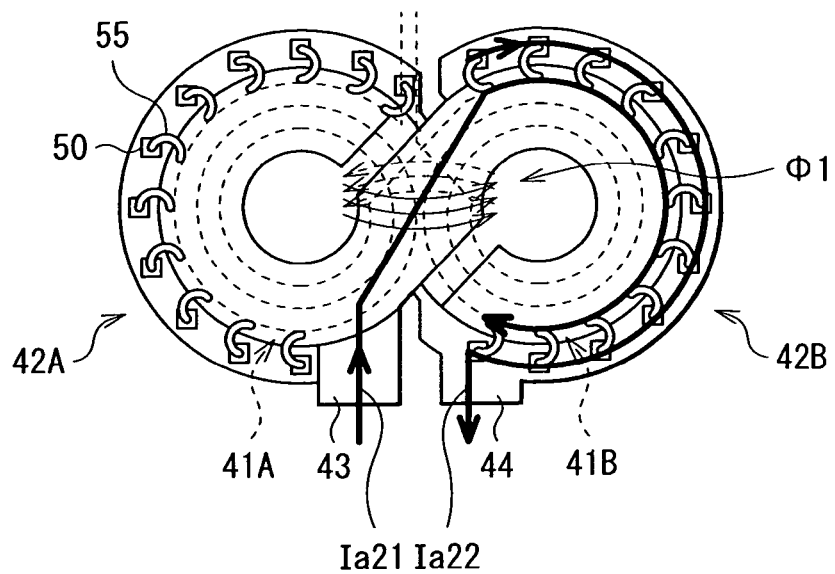
FIG. 8 shows a plan view for illustrating a characteristic function of the transformer and the rectifier circuit shown in FIG. 2.

On the other hand, as shown in FIG. 7, when the switching elements 11 and 14 of the inverter circuit 1 are turned off respectively, and when the switching elements 12 and 13 of the inverter circuit 1 are turned on respectively, a primary loop current Ib1 flows in a direction from the switching element 13 to the switching element 12. Thus, voltages induced in the secondary windings 42A and 42B of the transformer 4 respectively are in a reverse direction with respect to the rectifier diode 52, but in a forward direction with respect to the rectifier diode 51. Thus, a secondary loop current Ib2 flows through the rectifier diode 51, secondary winding 42A, choke coil 61, and output smoothing capacitor 62 in order. The secondary loop current Ib2 flows in this way, thereby the DC output voltage Vout is supplied to the not-shown low-voltage battery, and the load L is driven.

Next, functions of characteristic portions of the switching power supply unit of the embodiment are described in detail with reference to FIG. 8.

In the switching power supply unit of the embodiment, the secondary windings 42A and 42B of the transformer 4 are configured of the two sheet metals 43 and 44, and the rectifier diodes 51 and 52 in the rectifier circuit 5 are connected between the two sheet metals 43 and 44. Therefore, for example, when the secondary loop current Ia2 flows as shown in FIG. 6, a current Ia21 flows at a secondary winding 43B side of the sheet metal 43 as shown in FIG. 8. The current Ia21 flows to a sheet metal 44 side via the diode chips 50 (rectifier diodes 52-1 to 52-11), and thus a current Ia22 is induced. At that time, potential difference is generated between the sheet metals 43 and 44 (between an entrance and an exit of the secondary winding 42B) in proportion to the number of magnetic flux interlinking with the current Ia21 (number of magnetic flux $\Phi 1$), and the magnetic flux $\Phi 1$ concentrates to the center of a core having a high magnetic permeability as shown in FIG. 8.

Thus, potential difference is not generated in any region of the sheet metals 43 and 44 other than the center of the core (the region where the magnetic flux $\Phi 1$ concentrates). As a result, a current evenly flows to the diode chips 50 (rectifier diodes 52-1 to 52-11). Moreover, inductance of a line between the rectifier elements and the secondary windings is reduced compared with a usual case where rectifier elements are connected between a secondary winding and a wiring area, consequently surge voltage to the rectifier elements is effectively suppressed.

As hereinbefore, in the embodiment, the secondary windings 42A and 42B of the transformer 4 are configured of the two sheet metals 43 and 44, and the rectifier diodes 51 and 52 in the rectifier circuit 5 are connected between the two sheet metals 43 and 44. Therefore, inductance of a line between the rectifier elements and the secondary windings is reduced, consequently surge voltage to the rectifier elements is effectively suppressed. Accordingly, circuit efficiency can be effectively improved compared with a usual case.

Moreover, the rectifier diodes 51 and 52 are configured of the plurality of diode chips 50 (rectifier diodes 51-1 to 51-11 and rectifier diodes 52-1 to 52-11), and the rectifier diodes 51-1 to 51-11 and the rectifier diodes 52-1 to 52-11 are disposed at equal spaces along a winding direction of each of the sheet metals 43 and 44 respectively. Therefore, heat sink performance of each diode chip 50 is improved, and consequently the amount of allowable loss in each diode chip 50 can be increased. Accordingly, each rectifier element can be kept at a relatively low temperature.

Between the two sheet metals 43 and 44, the sheet metal 44 at the heat sink path side of the diode chips 50 has a large area compared with the sheet metal 43 at the other side. Therefore, heat quantity Q1 (amount of heat sink) from the diode chips 50 to a heat sink path side can be increased, and consequently the amount of allowable loss in each diode chip 50 can be increased. Accordingly, each rectifier element can be kept at a relatively low temperature.

Furthermore, the primary windings 41A and 41B are disposed between layers of the two sheet metals 43 and 44 respectively. Therefore, compared with a case where the primary windings 41A and 41B are disposed in a region other than a region between the layers of the two sheet metals 43 and 44 respectively (such as a case of FIG. 9 described below), power loss is decreased in the primary windings 41A, 41B and in the two sheet metals 43, 44 due to a proximity effect, consequently circuit efficiency can be improved.

Figure 9:
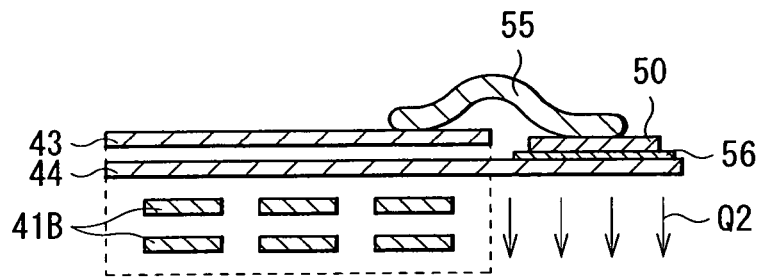
FIG. 9 shows a section view showing an outside configuration of a major part of each of a transformer and a rectifier circuit according to a modification of the first embodiment.

For example, as shown in FIG. 9, the primary windings 41A and 41B may be disposed in a region other than a region between the layers of the two sheet metals 43 and 44 respectively. Even in the case of such a configuration, some amount of heat flow Q2 occurs from the diode chips 50.

Figure 10:
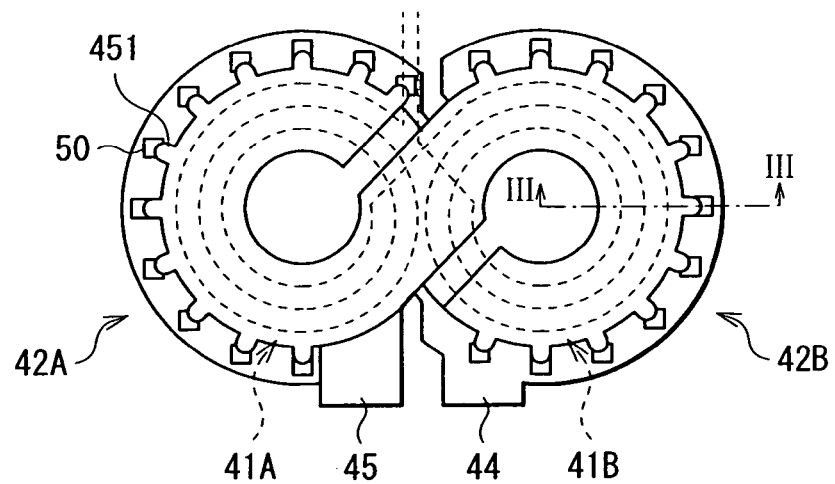
FIG. 10 shows a plan view showing an outside configuration of a major part of each of a transformer and a rectifier circuit according to another modification of the first embodiment.
Figure 11:
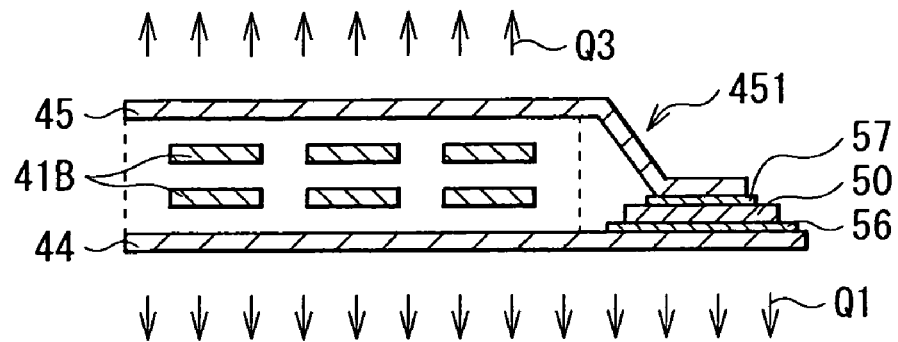
FIG. 11 shows a section view showing an outside configuration of the major part of each of the transformer and the rectifier circuit shown in FIG. 10.

Moreover, for example, as shown in FIG. 10 (plan view) and FIG. 11 (section view seen in an arrow direction of a portion along a line III-III in FIG. 10), the diode chips 50 may be directly connected between the two sheet metals 45 and 44 via solder 56 and solder 57. Specifically, the sheet metal 45 is directly connected to the diode chips 50 via the solder 57 through a joining portion 451. The sheet metal 45 corresponds to a specific example of each of "plurality of conductive plates", "two conductive plates", and "conductive plate at the other side". In the case of such a configuration, heat from the diode chips 50 (heat quantity Q1 and Q3) can be radiated not only from a sheet metal 43 side, but also from a sheet metal 45 side. Therefore, the amount of heat sink from the diode chips 50 can be increased, and consequently the amount of allowable loss in each diode chip 50 is increased. Accordingly, each rectifier element can be kept at a relatively low temperature.

Figure 12:
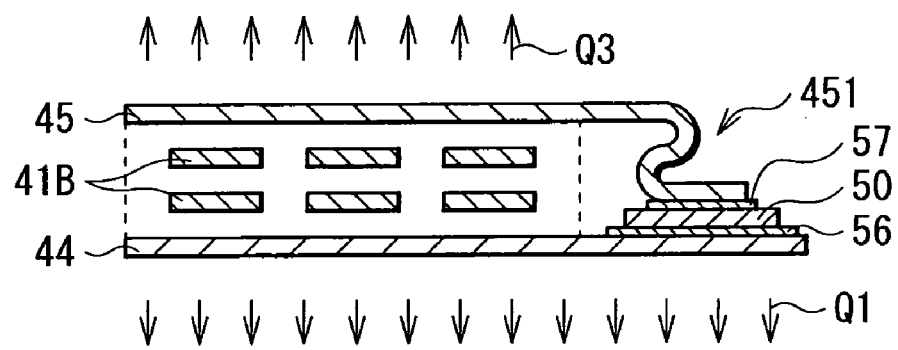
FIG. 12 shows a section view showing an outside configuration of a major part of each of a transformer and a rectifier circuit according to still another modification of the first embodiment.
Figure 13:
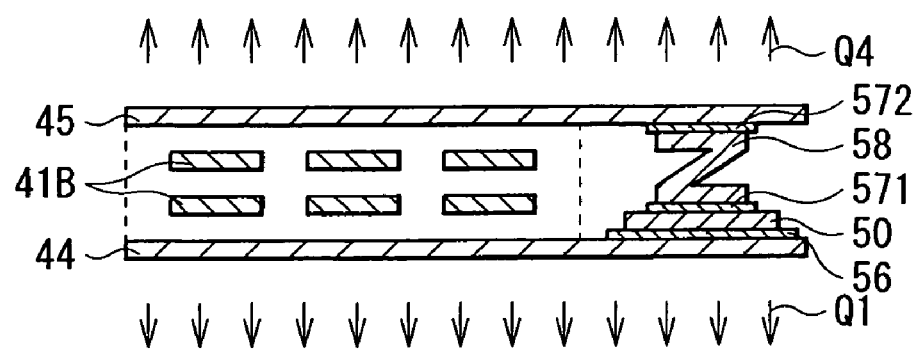
FIG. 13 shows a section view showing an outside configuration of a major part of each of a transformer and a rectifier circuit according to still another modification of the first embodiment.

In this case, the joining portion 451 may be folded, for example, as shown in FIG. 12. In the case of such a configuration, stress in the sheet metal 45 can be relieved, consequently reliability of a solder joint can be improved.

Furthermore, the diode chips 50 may be directly connected between two sheet metals 45 and 44 via solders 571, 572 and an independent connection member 58. In the case of such a configuration, the amount of heat sink from the diode chips 50 (amount of heat flow Q1 or Q4) can be further increased, and consequently the amount of allowable loss in each diode chip 50 can be increased, and stress in the sheet metal 45 can be relieved. Accordingly, each rectifier element can be kept at a relatively low temperature, and reliability of a solder joint can be improved.

Second Embodiment

Next, a second embodiment of the invention is described. The same components as in the first embodiment are marked with the same reference numerals and signs, and appropriately omitted to be described.

Figure 14:
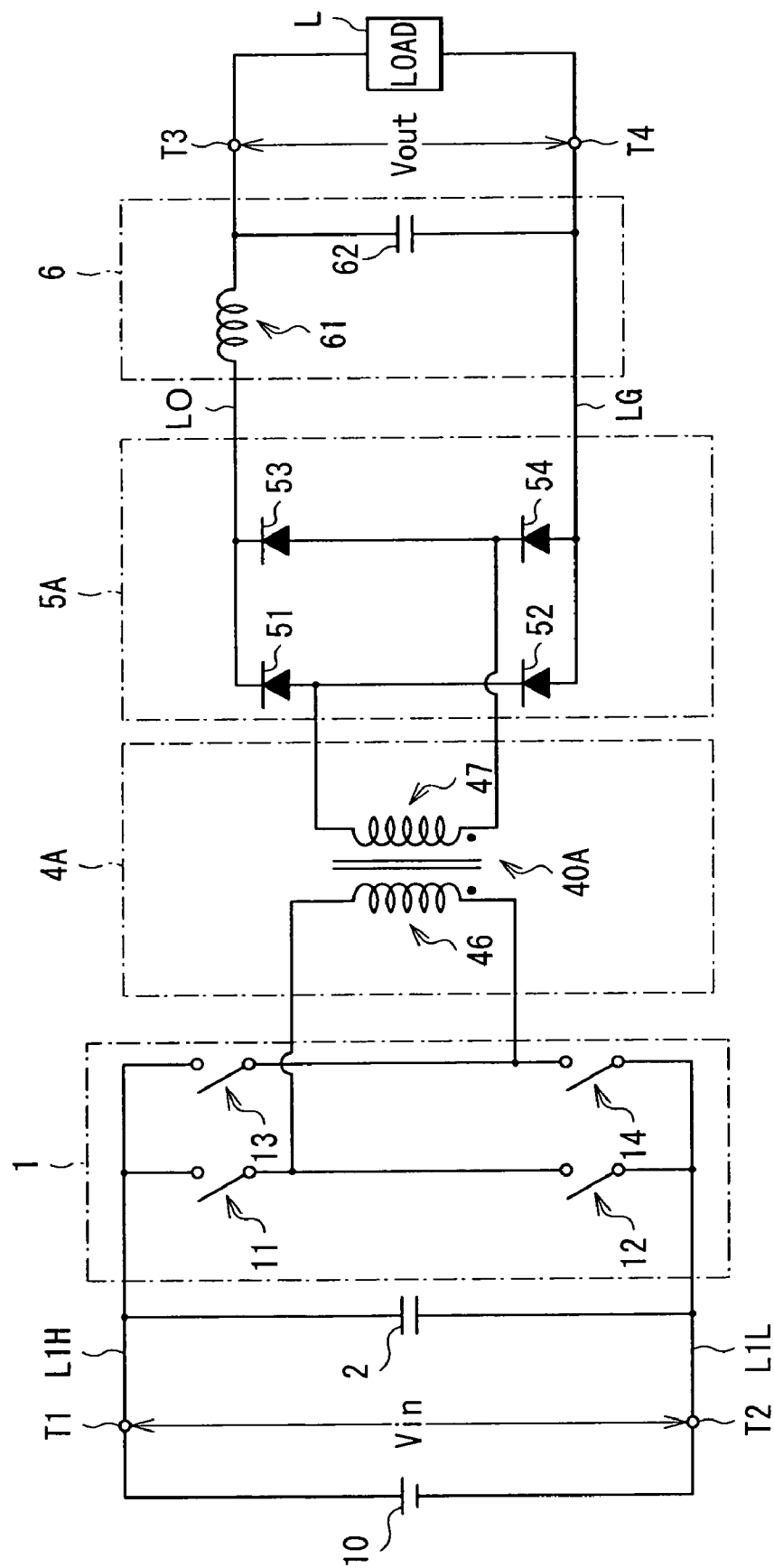
FIG. 14 shows a circuit diagram showing a configuration of a switching power supply unit according to a second embodiment of the invention.
Figure 15:
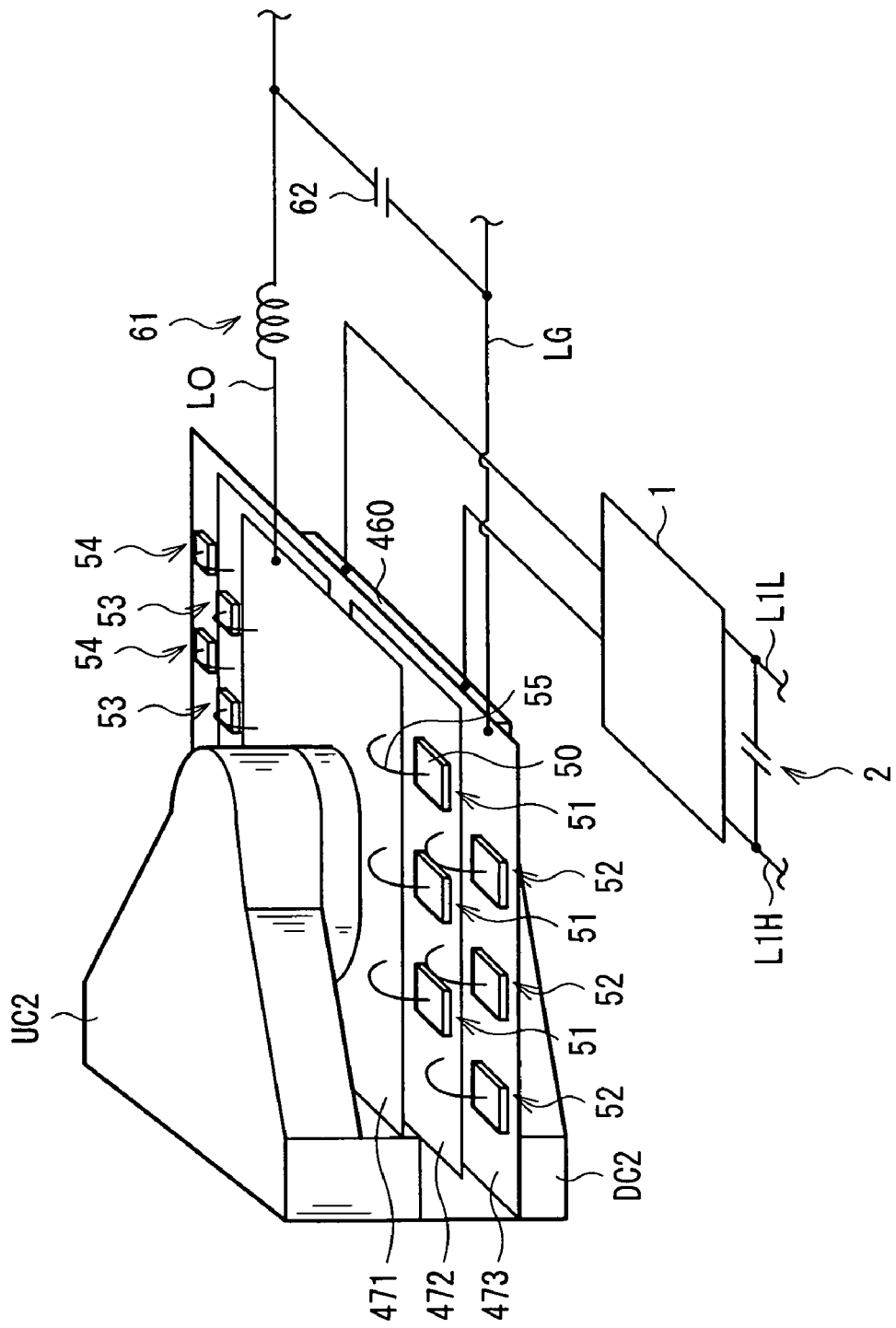
FIG. 15 shows a perspective view and a circuit diagram showing an outside configuration and the like of the major part of each of the transformer and the rectifier circuit shown in FIG. 14.

FIG. 14 shows a circuit configuration of a switching power supply unit according to the embodiment. The switching power supply unit of the embodiment corresponds to the switching power supply unit of the first embodiment being modified to include, in place of the transformer 4 and the rectifier circuit 5, a transformer 4A having a magnetic core 40A, one primary winding 46 and one secondary winding 47, and a rectifier circuit 5A of a full bridge type having four rectifier diodes 51 to 54. FIG. 15 shows a perspective view and a circuit diagram showing an outside configuration of each of the transformer 4A and the rectifier circuit 5A. FIG. 16 shows an exploded perspective view showing the outside configuration of each of the transformer 4A and the rectifier circuit 5A.

As shown in FIGS. 15 and 16, the transformer 4A of the embodiment has a structure where around a core material (magnetic core 40A) including an upper core UC2 and a lower core DC2 opposed to each other, a printed coil 460 configuring the primary winding 46 and three sheet metals 471 to 473 configuring the secondary winding 47 are wound in planes (horizontal planes) perpendicular to an extending direction (vertical direction) of magnetic cores UC21 and DC21, respectively.

A plurality of diode chips 50 configuring rectifier diodes 51 to 54 are connected between the two sheet metals 471 and 472 or two sheet metals 472 and 473 of the three sheet metals 471 to 473 by a bonding wire 55 (and not-shown solder 56).

The primary winding 46 corresponds to a specific example of "first winding" of an embodiment of the invention, and the secondary winding 47 corresponds to a specific example of "second winding" of an embodiment of the invention. The rectifier circuit 5A with the smoothing circuit 6 corresponds to a specific example of "rectifying and smoothing circuit" of an embodiment of the invention. The sheet metals 471 to 473 correspond to a specific example of "a plurality of conductive plates" of an embodiment of the invention, and the sheet metals 471 and 472 and the sheet metals 472 and 473 correspond to a specific example of "two conductive plates" of an embodiment of the invention respectively. The rectifier diodes 51 to 54 and the diode chips 50 correspond to a specific example of "rectifier elements" and a specific example of "diodes" of an embodiment of the invention respectively. The sheet metal 472 or the sheet metal 473 corresponds to a specific example of "conductive plate at the heat sink path side" of an embodiment of the invention, and the sheet metal 471 or the sheet metal 472 corresponds to a specific example of "conductive plate at the other side" of an embodiment of the invention.

According to such a configuration, even in the embodiment, the same advantages as in the first embodiment can be obtained due to the same operation as in the first embodiment. That is, inductance of a line between the rectifier elements and the secondary winding is reduced, consequently surge voltage to the rectifier elements can be effectively suppressed. Accordingly, circuit efficiency can be effectively improved compared with a usual case.

Hereinbefore, the invention was described with the first and second embodiments and modifications thereof. However, the invention is not limited to the embodiments and the like, and can be variously altered or modified.

For example, in the embodiments and the like, description was made on a case that a plurality of rectifier diodes are connected between two sheet metals configuring a secondary winding of a transformer. However, the number of the rectifier diodes to be connected may be optionally set, and for example, only one rectifier diode may be connected.

Moreover, in the embodiments and the like, description was made on a case that the rectifier diodes 51 to 54 are connected between two sheet metals configuring a secondary winding of a transformer. However, for example, such rectifier diodes may be connected between Nth-order windings (N: integer of 2 or more) such as tertiary windings of a transformer.

Figure 17:
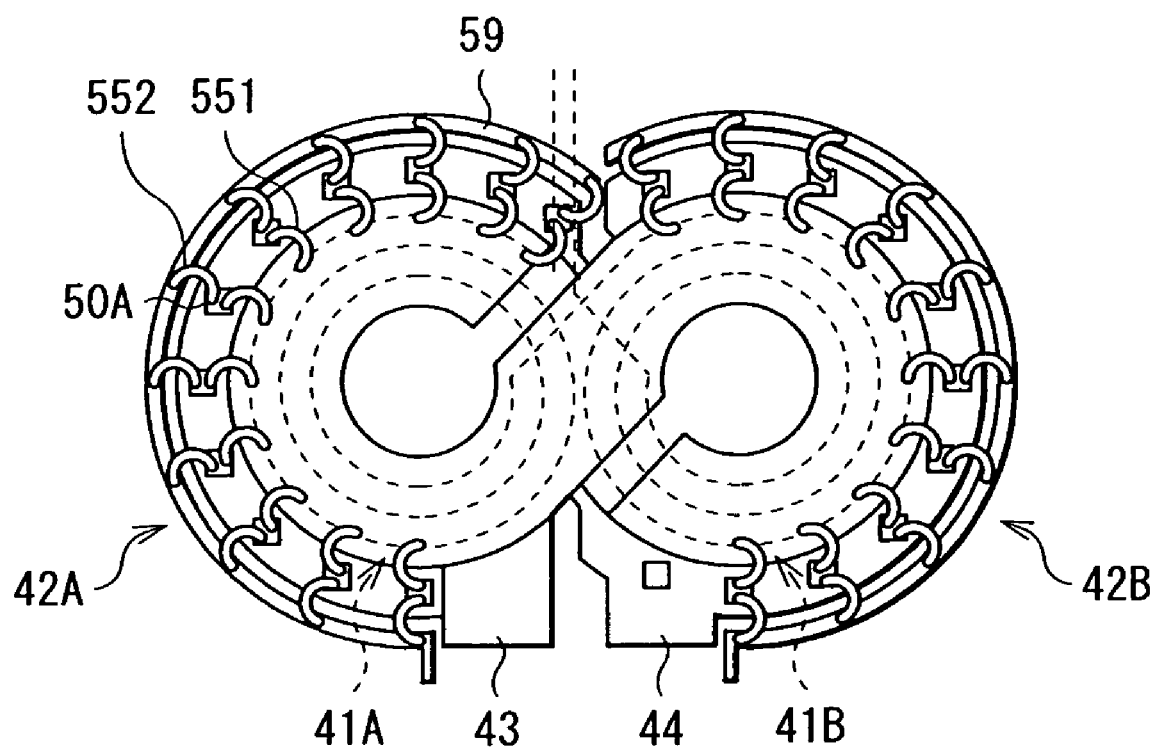
FIG. 17 shows a plan view showing an outside configuration of a major part of each of a transformer and a rectifier circuit according to a modification of an embodiment of the invention.

Moreover, in the embodiments and the like, description was made with the rectifier diode as an example of a rectifier element. However, for example, as shown in FIG. 17, FET (field effect transistor) may be used as the rectifier element. Specifically, for example, FET chips 50A on a sheet metal 44 may be connected to a sheet metal 43 by bonding wires 551, and gate terminals of the FET chips 50A may be commonly connected to a gate connection line 59 for operation control. When synchronous rectification operation is performed using such FET chips 50A, circuit efficiency can be further improved compared with the embodiments and the like.

Figure 18:
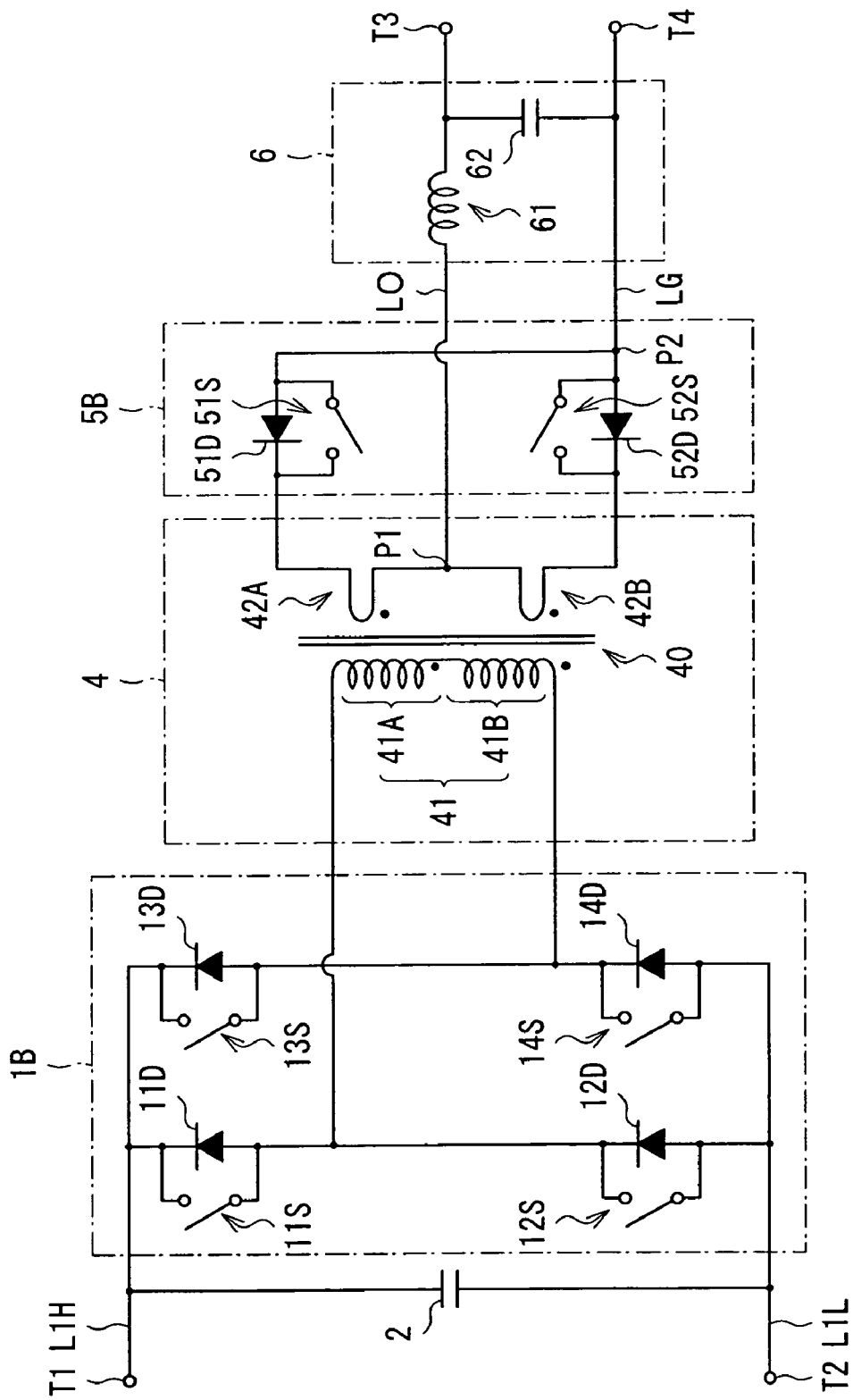
FIG. 18 shows a circuit diagram showing a configuration of a switching power supply unit according to a modification of an embodiment of the invention.

Moreover, in the switching power supply unit shown in FIG. 1, the switching elements 11 to 14 may be configured of MOS-FETs, and MOS-FETs may be provided in place of the rectifier diodes 51 and 52. In this case, in a switching circuit 1B, the switching elements 11 to 14 in the embodiments can be regarded to include switching elements 11S to 14S, and rectifier diodes 11D to 14D (parasitic diodes of the switching elements 11S to 14S) connected in parallel to the switching elements, for example, as in a switching power-supply unit shown in FIG. 18. In addition, in a switching circuit 5B, the rectifier diode elements 51 and 52 in the embodiment can be configured of switching elements 51S and 52S, and rectifier diodes 51D and 52D (parasitic diodes of the switching elements 51S and 52S) connected in parallel to the switching elements. In the case of such a configuration, a step-down operation as described in the embodiments is performed, in which a DC input voltage Vin inputted from the input terminals T1 and T2 is stepped down, and a DC output voltage Vout is outputted from the output terminals T3 and T4, in addition, a step-up operation as described below can be performed, in which a DC input voltage Vin inputted from the output terminals T3 and T4 is stepped up, and a DC output voltage Vout is outputted from the input terminals T1 and T2 (bi-directional operation can be made). In such a case, in the step-down operation (forward operation), the switching circuit 1B acts as an inverter circuit, and the switching circuit 5B acts as a rectifier circuit, and in the step-up operation (reverse operation), the switching circuit 5B acts as an inverter circuit, and the switching circuit 1B acts as a rectifier circuit.

In this case, the input terminals T1 and T2 correspond to a specific example of "first input/output terminal" of an embodiment of the invention, and the output terminals T3 and T4 correspond to a specific example of "second input/output terminal" of an embodiment of the invention. The switching circuit 1B corresponds to a specific example of "first circuit" of an embodiment of the invention, and the switching circuit 5B corresponds to a specific example of "second circuit" of an embodiment of the invention. The switching elements 11S to 14S correspond to a specific example of "first switching elements" of an embodiment of the invention, and the rectifier diodes 11D to 14D correspond to a specific example of "first rectifier elements" of an embodiment of the invention. The switching elements 51S and 52S correspond to a specific example of "second switching elements" of an embodiment of the invention, and the rectifier diodes 51D and 52D correspond to a specific example of "second rectifier elements" of an embodiment of the invention.

In the step-up operation (reverse operation), a drive signal to each of the switching elements 11S to 14S continuously has a voltage of 0 V, and therefore the switching elements 11S to 14S are continuously off. However, in the case of the synchronous rectification, the switching elements 11S to 14S also performs on/off operation, consequently loss is reduced compared with the case of using the rectifier diodes. In the following description using FIGS. 19 to 21, a case that the switching elements 11S to 14S perform such synchronous rectification is described.

Figure 19:
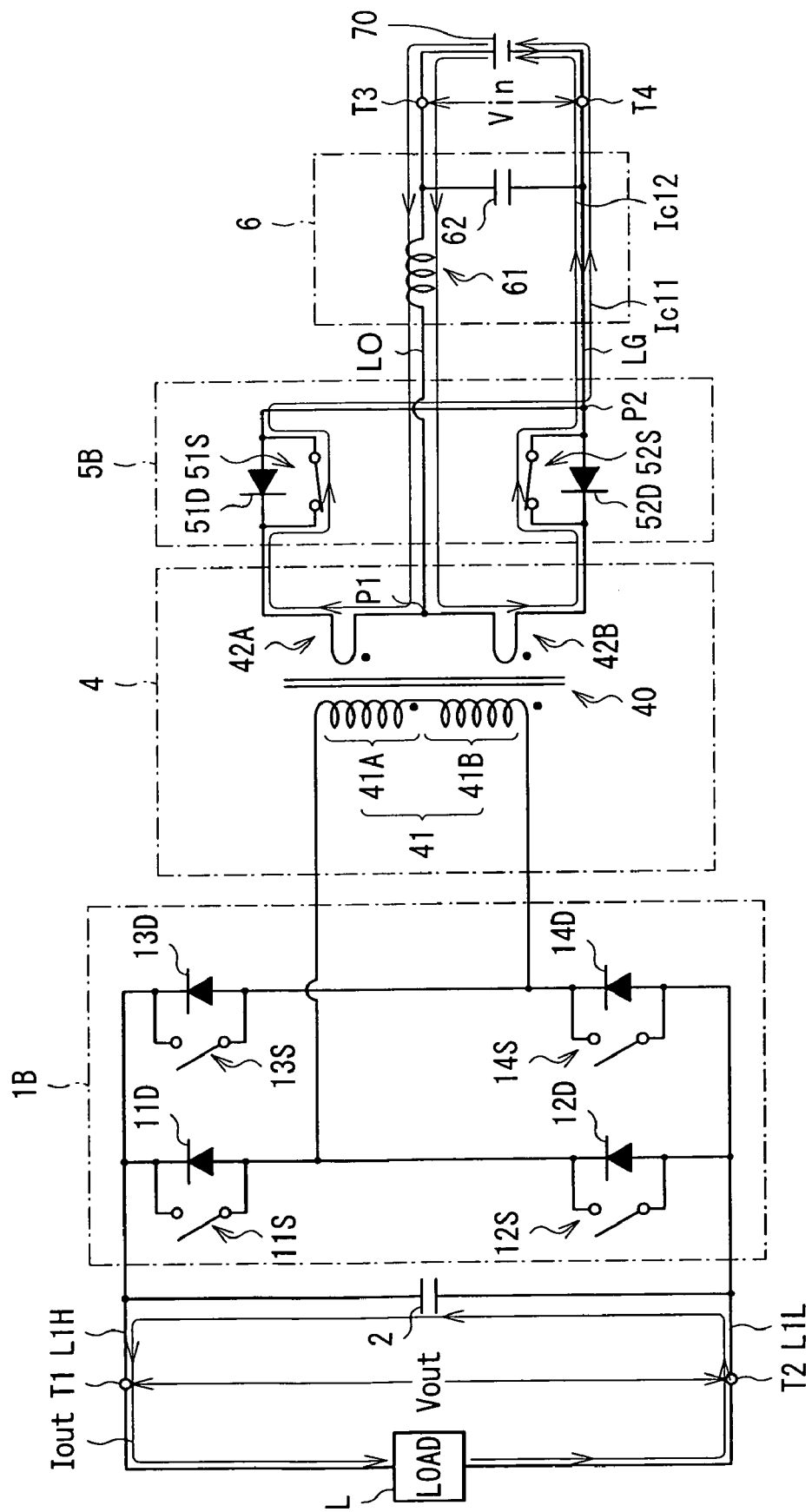
FIG. 19 shows a circuit diagram for illustrating operation of the switching power supply unit shown in FIG. 18.

First, as shown in FIG. 19, both of the switching elements 51S and 52S are turned on. Therefore, loop currents Ic11 and Ic12 as shown in the figure flow from a low-voltage battery 70 at a low-voltage side including the switching circuit 5B, so that an inductor 61 is excited. Since windings 42A and 42B of the transformer 4 are opposite in winding direction to each other, and equal in number of turns, magnetic fluxes caused by currents flowing through the windings 42A and 42B are canceled by each other, and a voltage is 0 V between ends of either of the windings 42A and 42B. Accordingly, in this period, power transmission is not performed from a low voltage side to a high voltage side. However, at the high voltage side, an output current Iout as shown in the figure flows from an input smoothing capacitor 2 to a load L.

Figure 20:
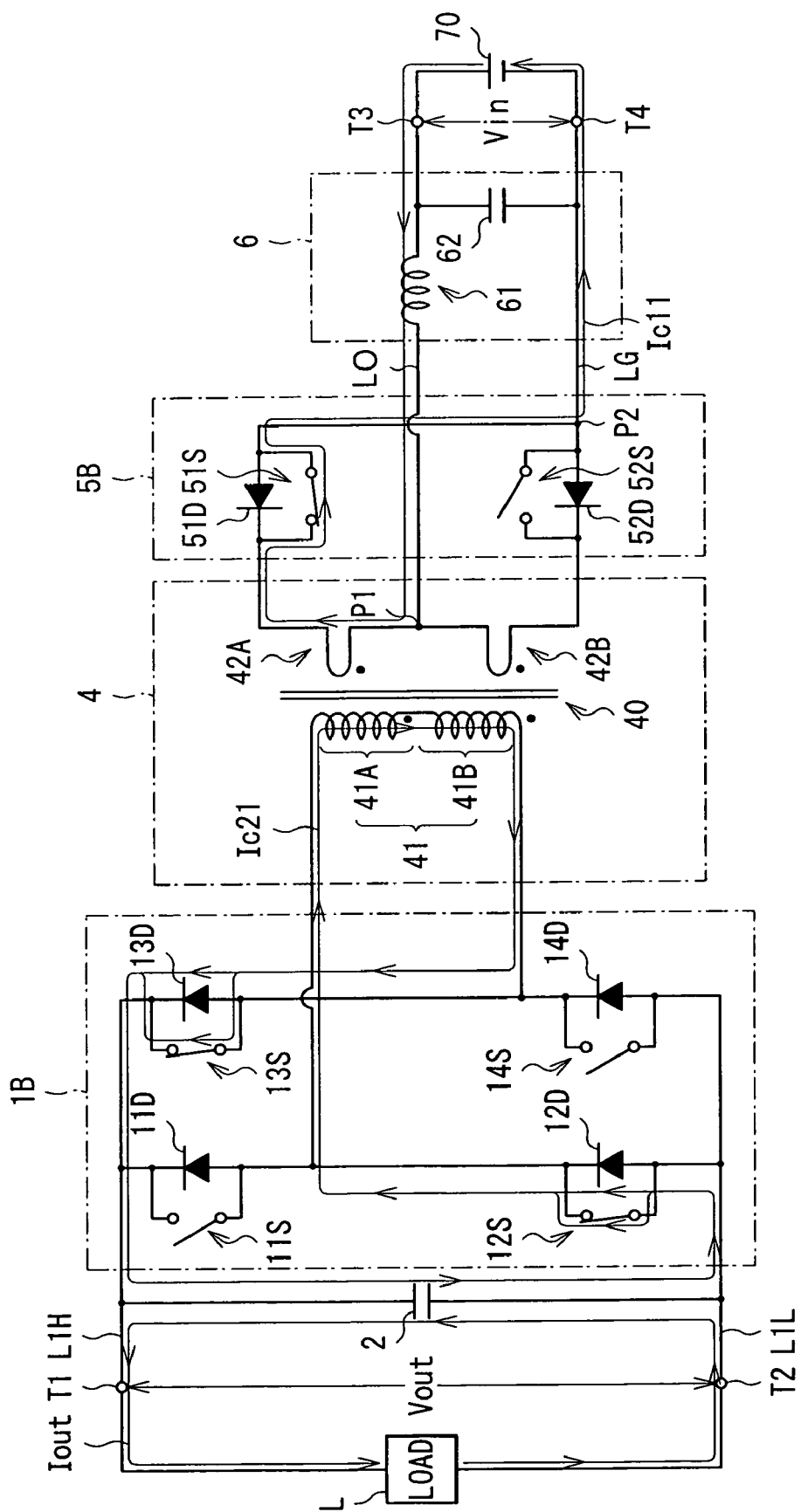
FIG. 20 shows a circuit diagram for illustrating the operation of the switching power supply unit shown in FIG. 18.

Next, the switching element 52 is turned off as shown in FIG. 20. Accordingly, only the loop current Ic11 as shown in the figure flows at the low voltage side, and power transmission is performed from the low voltage side to the high voltage side based on energy stored in the inductor 61. At that time, in the switching circuit 1B, while switching elements 12S and 13S are on, and switching elements 11S and 14S are off, synchronous rectification operation is performed. After a period of an operation condition as shown in FIG. 20 has passed, an operation condition returns to such an operation condition as shown in FIG. 19.

Figure 21:
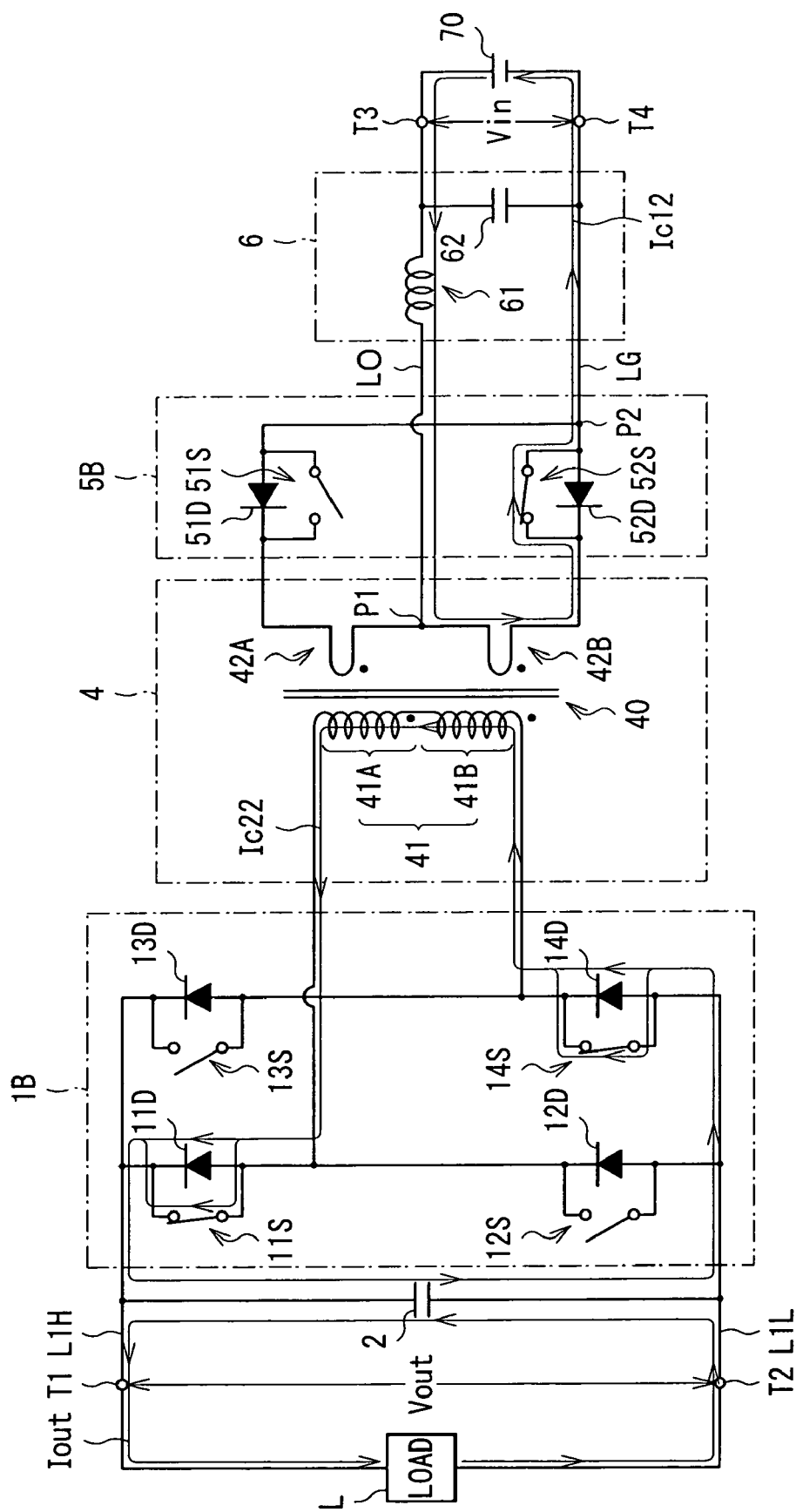
FIG. 21 shows a circuit diagram for illustrating the operation of the switching power supply unit shown in FIG. 18.

Next, when such second operation condition as shown in FIG. 19 has been finished, the switching element 51 is turned off as shown in FIG. 21. Accordingly, only the loop current Ic12 as shown in the figure flows at the low voltage side, and power transmission is performed from the low voltage side to the high voltage side based on energy stored in the inductor 61. At that time, in the switching circuit 1B, while the switching elements 11S and 14S are on, and the switching elements 12S and 13S are off, synchronous rectification operation is performed.

In the embodiments and the like, description was made with specific shapes of the primary winding and the secondary winding (sheet metal). However, such shapes of the primary winding and secondary winding (sheet metal) are not limitative, and other shapes may be used.

In the embodiments and the like, description was made on a case that the inverter circuit 1 was an inverter circuit of a full bridge type. However, a configuration of the inverter circuit 1 is not limited to this, and for example, may be a half bridge type or a forward type.

In the embodiments and the like, description was made on a case that the rectifier circuits 5 and 5A are in the center tap type with anode common connection and full bridge type respectively. However, a configuration of the rectifier circuit is not limited to those, and for example, the rectifier circuit may be in a center tap type with cathode common connection rather than anode common connection, or may be configured in a type other than the center tap type (for example, a half bridge type, forward type, and flyback type). Moreover, a rectifier circuit of a half-wave rectification type may be used instead of the rectifier circuit of a full-wave rectification type.

Furthermore, each of the modifications described in the embodiment may be combined with the relevant embodiment or the like.

It should be understood by those skilled in the art that various modifications, combinations, sub-combinations and alterations may occur depending on design requirements and other factors insofar as they are within the scope of the appended claims or the equivalent thereof.

What is claimed is:

1. A switching power supply unit, having an input terminal pair and an output terminal pair, and performing voltage conversion of a DC input voltage inputted from the input terminal pair, thereby outputting a DC output voltage from the output terminal pair, the switching power supply unit comprising:
a transformer having a first winding disposed on a side of the input terminal pair, and a second winding disposed on a side of the output terminal pair,
an inverter circuit disposed on a side of the first winding, and performing switching operation onto the DC input voltage, and
a rectifying-smoothing circuit disposed on a side of the second winding, and rectifying and smoothing an AC voltage induced on the second winding in response to the switching operation of the inverter circuit, thereby generating the DC output voltage,
wherein
the second winding is configured of a plurality of conductive plates, and
the rectifying-smoothing circuit has one or more rectifier elements connected between two conductive plates of the plurality of conductive plates.

2. The switching power supply unit according to claim 1:
wherein
a plurality of rectifier elements are connected between the two conductive plates.

3. The switching power supply unit according to claim 2:
wherein
the plurality of rectifier elements are disposed at equal spaces along a winding direction of each of the two conductive plates.

4. The switching power supply unit according to claim 1:
wherein
one of the two conductive plates, the one provided on a heat sink path for the rectifier elements, has an area larger than that of the other conductive plate.

5. The switching power supply unit according to claim 1:
Wherein
the two conductive plates face each other, and
the first winding is disposed between the two conductive plates.

6. The switching power supply unit according to claim 1:
wherein
the transformer has first and second magnetic cores, each of the first and second magnetic cores having a pair of leg portions and a base portion which combines one end of one of the leg portions and one end of the other leg portion, and
the first winding and the plurality of conductive plates are wound in planes perpendicular to an extending direction of the leg portions of the first and second magnetic cores.

7. A switching power supply unit, performing voltage conversion of a DC input voltage inputted from one input/output terminal pair of first and second input/output terminal pairs, thereby outputting a DC output voltage from the other input/output terminal pair, the switching power supply unit comprising:
a transformer having a first winding disposed on a side of the first input/output terminal pair, and a second winding disposed on a side of the second input/output terminal pair,
a first circuit disposed on a side of the first winding, the first circuit having a plurality of first switching elements and first rectifier elements, the first rectifier elements being connected in parallel to the plurality of first switching elements respectively, and
a second circuit disposed on a side of the second winding, the second circuit having a plurality of second switching elements and second rectifier elements, the second rectifier elements being connected in parallel to the plurality of second switching elements respectively,
wherein
the second winding is configured of a plurality of conductive plates, and
the second rectifier elements in the second circuit are connected between two conductive plates of the plurality of conductive plates.

* * * * *